(12) United States Patent
Yamamoto

(10) Patent No.: US 8,456,678 B2
(45) Date of Patent: Jun. 4, 2013

(54) IMAGE READING APPARATUS AND IMAGE READING METHOD

(75) Inventor: Naohiro Yamamoto, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 404 days.

(21) Appl. No.: 12/797,377

(22) Filed: Jun. 9, 2010

(65) Prior Publication Data
US 2010/0315677 A1  Dec. 16, 2010

(30) Foreign Application Priority Data

Jun. 15, 2009  (JP) .................................. 2009-142536

(51) Int. Cl.
*G06F 3/12* (2006.01)
(52) U.S. Cl.
USPC .............. 358/1.15; 358/1.9; 358/448; 345/84

(58) Field of Classification Search
USPC ....................................................... 358/1.15
See application file for complete search history.

(56) References Cited

U.S. PATENT DOCUMENTS

2008/0100887 A1   5/2008  Hayase
2009/0152024 A1*  6/2009  Yamazaki et al. ......... 178/18.07

FOREIGN PATENT DOCUMENTS

JP      2008-118190      5/2008

* cited by examiner

*Primary Examiner* — Marivelisse Santiago Cordero
*Assistant Examiner* — Aaron R Gerger
(74) *Attorney, Agent, or Firm* — Carter, DeLuca, Farrell & Schmidt LLP

(57) ABSTRACT

An image reading method includes generating pattern data for correcting a reading characteristic of a document reading apparatus, displaying the generated pattern data, reading the displayed pattern data, and correcting the reading characteristic of the document reading apparatus based on the generated pattern data and the read pattern data.

9 Claims, 18 Drawing Sheets

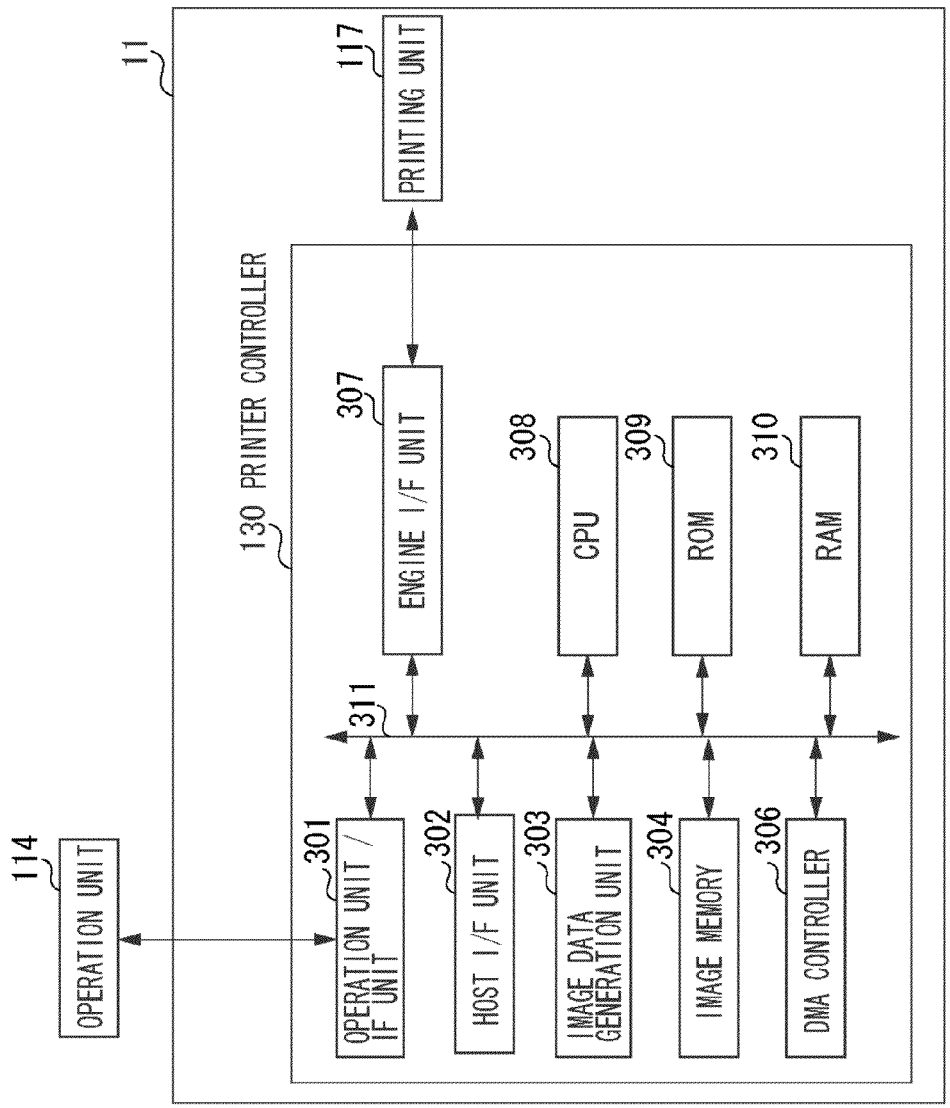

IMAGE READING APPARATUS AND IMAGE READING METHOD

BACKGROUND OF THE INVENTION

1. Field of the Invention

The present invention relates to an image reading apparatus and an image reading method. For example, the present invention relates to image processing such as copying using a scanner.

2. Description of the Related Art

Most of reading apparatuses such as a scanner for reading a document include members such as a mirror, a lens, and a sensor. The characteristics of these members at a time of reading the document change due to factors such as an external temperature, humidity, an operation time, and heat. Thus, an image quality of original image data to be read thereby changes due to the change of these characteristics.

For example, when these characteristics of a mirror and a lens change, a focus vibration value changes, and an image blur generates. Therefore, reading correction should be performed for every image for securing an optimum image quality even when these optical characteristics of the reading system change.

Conventionally, the image reading correction has been performed with the following procedure. A document with a previously created special chart pattern, on which information needed for image reading correction (e.g., chart data with a line pattern) is printed, is prepared, and a reading unit of an image reading apparatus reads the document. Then, based on image data of the read chart pattern, the image reading apparatus performs correction with respect to a change of the optical characteristic of the image reading apparatus, and performs image reading correction so as to acquire desired image data.

Japanese Patent Application Laid-Open No. 2008-118190 discusses a technique for correcting image data. By the technique, a device such as a color printer outputs a color patch to an output unit, and an image reading apparatus generates a forward conversion table for converting a color of a device color space to a device-independent color, based on the colorimetric results of the output color patch. Then, using the generated forward conversion table, the image reading apparatus corrects read image data.

However, the image reading correction discussed in Japanese Patent Application Laid-Open No. 2008-118190 needs an operation including steps of printing the special pattern data on a paper, positioning the printed paper on a document positioning plate of the image reading apparatus by a user, and reading the special pattern data. Therefore, it takes time and effort for a user for causing the apparatus to read the paper, on which the pattern data is printed, for every image reading correction. Further, it is necessary to prepare various pattern data according to various kinds of correction processing.

SUMMARY OF THE INVENTION

The present invention is directed to an image reading apparatus and an image reading method capable of reducing time and effort for a user to perform image reading correction.

According to an aspect of the present invention, an image reading apparatus includes a document reading unit configured to read a document. The image reading apparatus further includes a generation unit configured to generate pattern data for correcting a reading characteristic of the document reading unit. The image reading apparatus yet further includes a display unit configured to display the pattern data generated by the generation unit. The image reading apparatus yet further includes a pattern reading unit configured to read the pattern data displayed by the display unit. The image reading apparatus yet further includes a correction unit configured to correct the reading characteristic of the document reading unit, based on the pattern data generated by the generation unit and the pattern data read by the pattern reading unit.

According to the present invention, the image reading apparatus reads pattern data displayed by a display device, and corrects the image reading characteristic. Thus, a user can easily correct the reading characteristic of the image reading apparatus, without causing a reading unit to read a document on which the pattern data is printed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a block diagram illustrating a configuration of image forming unit.

DESCRIPTION OF THE EMBODIMENTS

Various exemplary embodiments, features, and aspects of the invention will be described in detail below with reference to the drawings.

Figure 1:
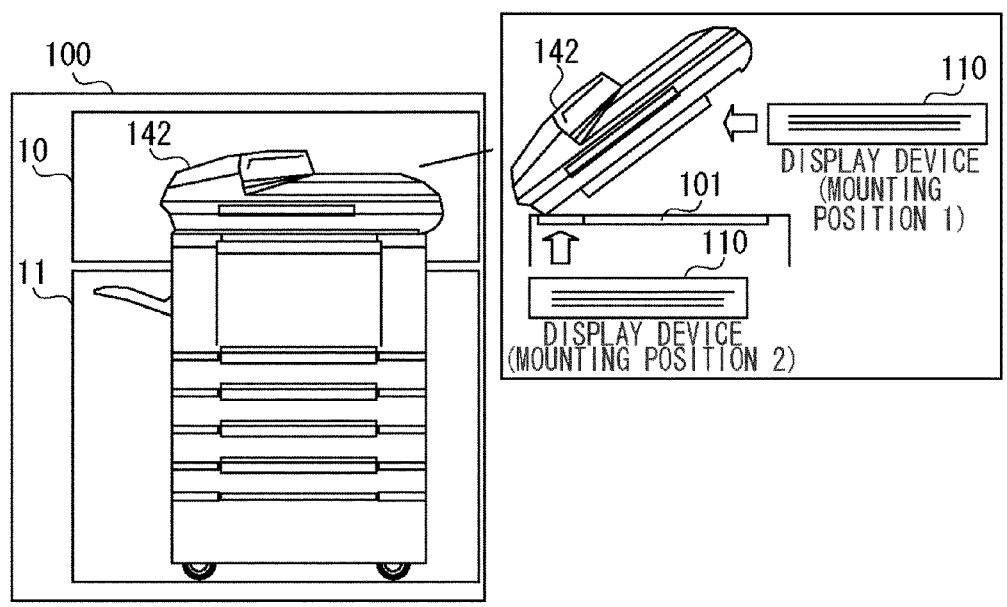
FIG. 1 illustrates an example configuration of an image processing apparatus according to an exemplary embodiment.

FIG. 1 illustrates an image processing apparatus that can be applied to the present invention.

A multifunction peripheral (MFP) 100, which is an example of the image processing apparatus according to the present invention, is a composite machine capable of realizing a plurality of functions. For example, the MFP 100 has functions for recording and printing image data read from a document by an image reading apparatus 10. The image reading apparatus 10 performs processing for reading an image and acquiring desired image data. An image forming unit 11 has functions for subjecting the image data read by the image reading apparatus 10 to image processing and printing the image data.

A configuration of the image forming unit 11 will be described with reference to FIG. 6.

The image forming unit 11 includes a printing unit 117 and a printer controller 130. The printing unit 117 prints image data read by the image reading apparatus 10 on a recording medium. When the image forming unit 11 copies one document image, the printing unit 117 subjects the read image data to image processing, generates a recording signal, and prints the recording signal on the recording medium.

When the image forming unit 11 copies a plurality of document images, a storage unit 116 once stores one recording signal, outputs the recording signal one by one to the printing unit 117, and causes the printing unit 117 to print the image data on the recording medium.

A printer controller 130 controls various kinds of printing. An image data generation unit 303 receives image data input via a host interface (I/F) unit 302. The image data generation unit 303 analyzes the input image data (e.g., page description language (PDL) analysis processing), generates an intermediate language from the analyzed results, and generates bitmap data that can be handled by the printing unit (printer engine) 117.

The image reading apparatus 10 further includes the following configuration in FIG. 1. An image reading unit 142 reads pattern data displayed by a display device 110 or a document. In the present exemplary embodiment, an image reading unit configured to read a document and an image read unit configured to read pattern data displayed by the display device 110 are included in the image reading unit 142. However, these image reading units can be provided separately. A document positioning plate 101 is for positioning a document on a predetermined position. The display device 110 is configured to display specific pattern data, and is provided at a mounting position 1 or a mounting position 2 in FIG. 1.

Figure 2:
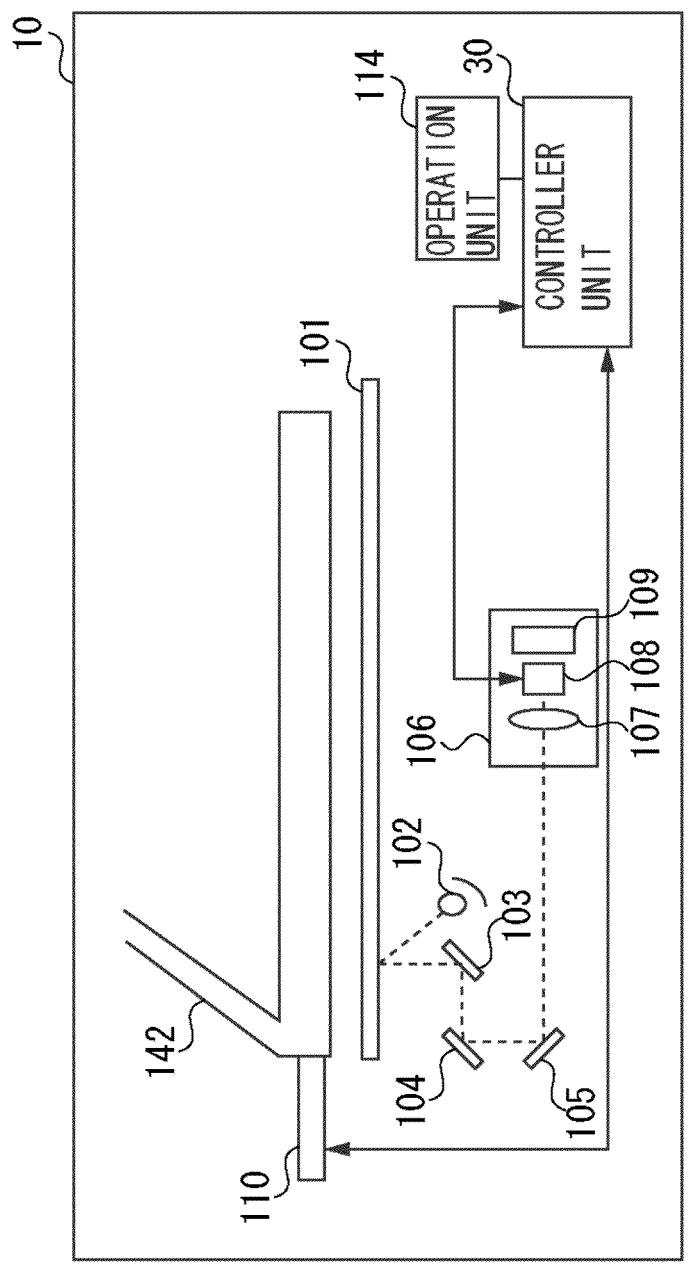
FIG. 2 illustrates an example configuration of an image reading apparatus according to an exemplary embodiment.

FIG. 2 illustrates a configuration of the image reading apparatus 10 in FIG. 1. As for parts with the same numeral symbols as those in FIG. 1, descriptions will be omitted.

An illumination lamp 102 is configured with, for example, a halogen lamp, and irradiates the document positioned on the document positioning plate 101. Scanning mirrors 103, 104, and 105 are included in an optical scanning unit. A solid image sensor unit 106 is configured with an imaging lens 107, a solid image sensor 108, and a driver 109 for driving the solid image sensor 108. The solid image sensor 108 includes, for example, a charge coupled device (CCD) line sensor.

The configuration of the image reading apparatus 10 illustrated in FIG. 2 is described, as an example, with a method for reading image data by the CCD line sensor via a reducing optical system including the optical mirrors 103, 104, and 105, and the imaging lens 107. However, the image reading apparatus 10 of the present invention is not limited to this, and can be an image reading apparatus that reads image data by a method including a same size optical system using a contact image sensor (CIS).

A controller unit 30 performs central control for an image data reading operation. The image data read by the solid image sensor 108 is transmitted to the controller unit 30. The controller unit 30 performs correction processing on the image data for securing an optimum image quality, and other various image processing. Further, the controller unit 30 performs various controls such as a display control to the display device 110, and an operation control of the solid image sensor unit 106.

The controller unit 30 can be provided outside the image reading apparatus 10, or can be provided, for example, inside the image forming unit 11. When the controller unit 30 is provided in the image forming unit 11, the controller unit 30 has an interface to output the image data read by the image reading apparatus 10 to the image forming unit 11.

An operation unit 114 is configured to perform operations such as starting reading and print setting. The operation unit 114 supplies, to a user, various kinds of operations and displays for instructing to execute various kinds of processing by the user. The operation unit 114 is connected to the controller unit 30. The operation unit 114 includes a document reading start instruction button for issuing an instruction to start reading a document, and a correction start instruction button for issuing an instruction to start image reading correction processing.

By pressing the correction start instruction button, the operation unit 114 transmits an instruction for starting image reading correction processing to the controller unit 30.

Then, document reading processing in the image reading apparatus 10 will be described below.

In a state where a document is positioned on the document positioning plate 101 or an auto document feeder (ADF), the operation unit 114 detects pressing of the document reading start instruction button by a user, and starts document reading processing. According to the start of document reading, the image reading unit 142 feeds the document to the document positioning plate 101 from the ADF. Or the image reading unit 142 irradiates a document image by a light source (not illustrated) with respect to the document positioned on the document positioning plate 101.

The reflection light of the document image is incident in the solid image sensor unit 106 via the scanning mirrors 103, 104, and 105, and forms the image on the solid image sensor 108 by the imaging lens 107.

The image data read by the solid image sensor 108 is transmitted to the controller unit 30, and the controller unit 30 performs to image processing on the image data. In addition, although a paper document is used as an example of a print product read by the image reading unit 142, a print product including a recording medium other than a paper (e.g., permeable documents such as an overhead projector (OHP) sheet and a film, and clothes) can be used as an object for reading by the image reading unit 142.

Figure 3:
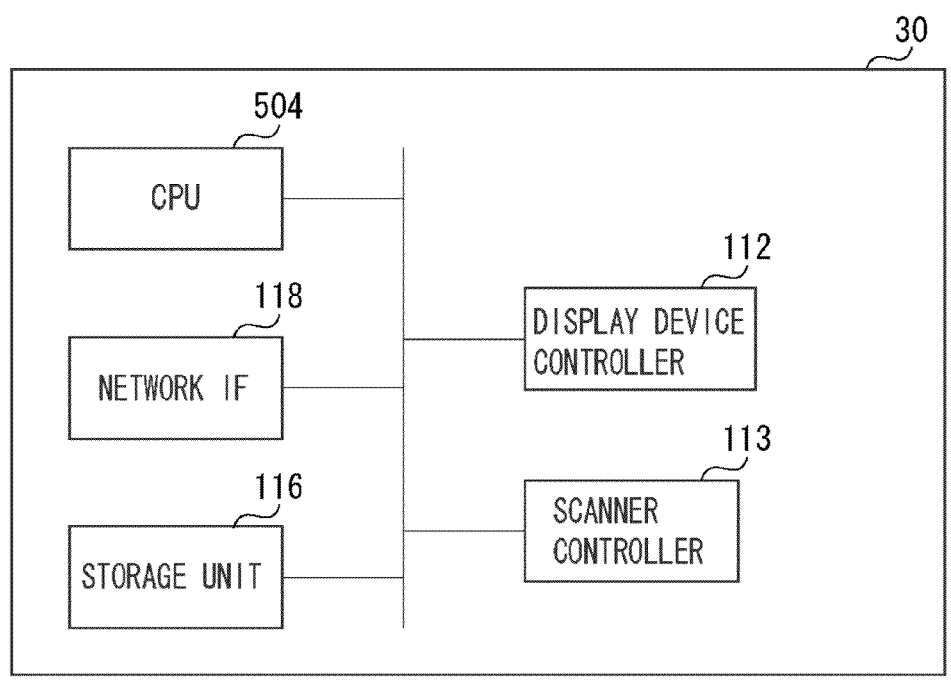
FIG. 3 is a block diagram illustrating a configuration of a controller unit according to an exemplary embodiment.

FIG. 3 illustrates a configuration of the controller unit 30 in FIG. 2.

The controller unit 30 includes a central processing unit (CPU) 504, a device controller 112, a scanner controller 113, a storage unit 116, and a network IF 118 that is connected to a network to perform communication of information with external apparatuses. These blocks are mutually connected with an internal bus. The CPU 504 collectively controls each of these blocks, and issues an instruction for starting image reading correction.

The display device controller 112 controls displaying of the display device 110. The scanner controller 113 performs various kinds of reading controls to the read image data. The storage unit 116 stores a program corresponding to a flowchart executed by the CPU 504, and stores the read image data. The display device controller 112 receives pattern data from the scanner controller 113, controls applied voltage to the display device 110, and causes the display device 110 to display specific pattern data.

The scanner controller 113 outputs pattern data, which is to be displayed by the display device 110, to the display device controller 112. The scanner controller 113 receives image data from the solid image sensor 108, and performs reading correction processing based on the received image data. Further, the scanner controller 113 performs reading control to the image reading unit 142, when the image reading unit 142 reads a document or pattern data of the display device 110.

Figure 4:
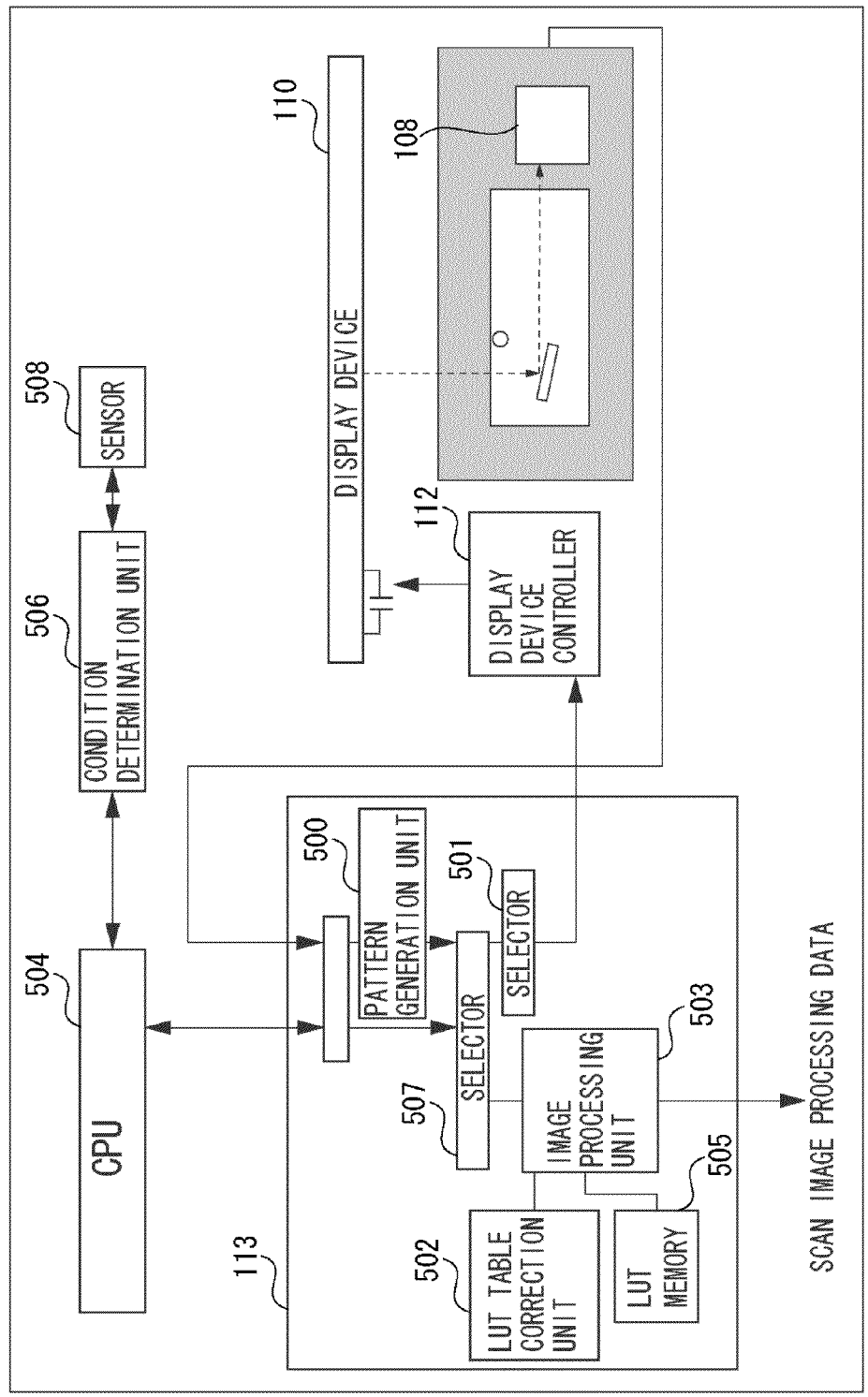
FIG. 4 is a block diagram illustrating an example configuration for performing image reading correction according to an exemplary embodiment.

FIG. 4 illustrates a configuration when the scanner controller 113 reads the pattern data displayed by the display device 110.

The scanner controller 113 includes a pattern generation unit 500, an image processing unit 503, a look-up table (LUT) table correction unit 502, a LUT memory 505, and selectors 501 and 507. The scanner controller 113 collectively performs various kinds of processing, for example, image processing to image data read by the solid image sensor 108, generating pattern data, outputting the pattern data to the display device controller 112, and outputting a display instruction signal.

The image processing unit 503 is connected with the LUT table correction unit 502 and the LUT memory 505.

The LUT memory 505 stores a look-up table. The look-up table is used to obtain image data, which is corrected according to optical characteristics of a scanning mirror and a sensor, as an output value, with respect to an input value of each of pixel component data of red, green, and blue (RGB) of image data read from a document. The LUT memory 505 is rewritable by access from the CPU 504.

In the LUT memory 505, for example, an output value, of which modulation transfer function (MTF) is already corrected, is stored for every combination of the RGB of the read image data. Further, the LUT memory 505 stores, as a value of the look-up table, a filter coefficient at a time of correcting each value of RGB by filtering using a of 8×8 filter.

The LUT table correction unit 502 calculates a correction value for changing a look-up table value stored in the LUT memory 505, based on the pattern data generated by the pattern generation unit 500 and the read pattern data. From a result of evaluating image data acquired by reading the pattern data, when an error occurs in the look-up table of the LUT memory 505, the CPU 504 rewrites the look-up table value stored in the LUT memory 505 to the correction value calculated by the LUT table correction unit 502.

The pattern generation unit 500 generates pattern data for causing the display device 110 to display the pattern data. The generated pattern data is used as a test pattern for investigating the reading characteristics of the image reading apparatus 10.

Figure 5A:
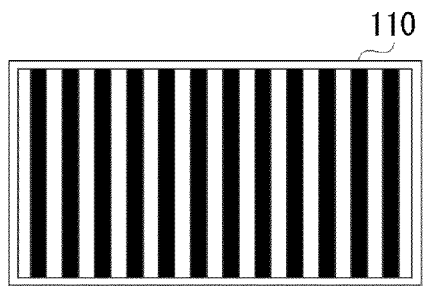
FIGS. 5A, 5B, and 5C illustrate pattern data displayed by a display device according to an exemplary embodiment.
Figure 5B:
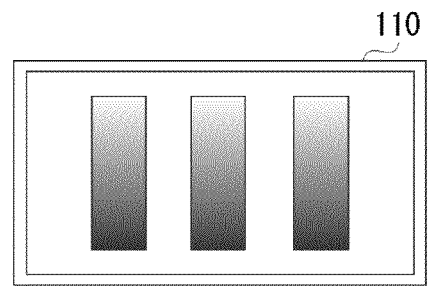
Figure 5C:
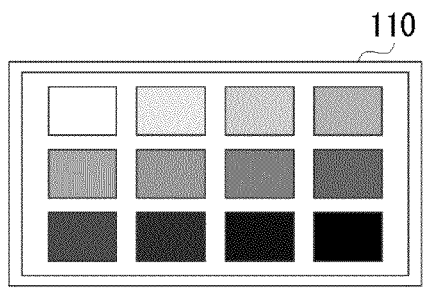

The pattern generation unit 500 generates a specific pattern data which becomes a comparison reference for correcting distortion of an optical system in the image reading unit 142, and change of MTF value due to change of the optical characteristics. FIGS. 5A, 5B, and 5C illustrate examples of pattern data displayed by the display device 110.

The pattern generation unit 500 causes the display device 110 to display the pattern data for investigating the reading characteristics of the image reading apparatus, as illustrated in FIGS. 5A to 5C. FIG. 5A illustrates line chart pattern data. In the line chart pattern data, at least two kinds of density patterns, e.g., white and black, are arrayed alternately.

FIG. 5B illustrates pattern data of 256 gradations of each component of the RGB. In FIG. 5B, the pattern data of 256 gradations of the R component is illustrated on the left, the pattern data of 256 gradations of the G component is illustrated on the center, and the pattern data of 256 gradations of the B component is illustrated on the right.

FIG. 5C illustrates a color patch expressed with gradation pattern data, which are gradation expressed. The display device 110 can change which pattern data should be displayed by an instruction of the display device controller 112. Further, the display device 110 can change the number of steps of gradation of pattern data or the number of line of a line chart pattern.

A kind of the pattern displayed by the display device 110 is determined according to correction contents of the reading characteristics of the image reading apparatus 10. For example, when the image reading apparatus 10 reads an image and corrects bleeding, obscuring, and non-smoothness of the read line, the display device 110 displays the line chart pattern data illustrated in FIG. 5A.

When the image reading apparatus 10 reads an image and corrects a tint of the read data, the display device 110 displays the pattern data of 256 gradations of each component of the RGB in FIG. 5B. When the image reading apparatus 10 reads an image and corrects gradation of density of the read data, the display device 110 displays the gradation pattern data in FIG. 5C, which are gradation expressed.

When shading correction of a scanner is performed, the display device 110 displays data for shading correction. The data for shading correction is data presenting a white board for shading correction used in conventional shading correction.

The pattern data generated by the pattern generation unit 500 is transmitted to the display device controller 112 or the image processing unit 503 via the selectors 507 and 501. The selectors 507 and 501 select a path of image data according to a signal for instructing selection from the CPU 504.

When the display device 110 displays the pattern data, the CPU 504 selects the selectors 507 and 501 to transmit the pattern data to the display device controller 112.

The display device controller 112 controls an applied voltage to the display device 110 according to a starting signal from the scanner controller 113. The display device controller 112 controls the applied voltage, and controls switching the display/non-display of the pattern data displayed by the display device 110, changing the display contents, and contrast and resolution of the pattern data at a time of displaying.

When the display device controller 112 does not receive, from the scanner controller 113, the starting signal for displaying the pattern data to the display device 110, the display device controller 112 sets the applied voltage to the display device 110 to be less than a prescribed value, and the pattern data is made to be a non-displaying state.

When the display device controller 112 receives, from the scanner controller 113, the starting signal for displaying the pattern data, the display device controller 112 applies, to the display device 110, an applied voltage for realizing the contrast previously including difference of an optical path length. At that time, the display device controller 112 receives the pattern data to be displayed from the scanner controller 113, and outputs the pattern data to the display device 110.

A condition determination unit 506 is connected with a sensor 508 and the CPU 504. The sensor 508 includes, for example, a temperature sensor, a humidity sensor, and a position sensor. The sensor 508 detects change of reading conditions at a time of reading a document in the image reading apparatus 10.

The change of reading conditions at a time of reading a document is, for example, the change of optical characteristics of the scanning mirrors 103, 104, and 105, and the imaging lens 107, or the change of positioning characteristic of the solid image sensor unit 106. The sensor 508 detects that the reading conditions at a time of reading a document becomes specific conditions, and outputs an interrupt signal to the condition determination unit 506.

As for the specific conditions, for example, the temperature sensor detects rising of an internal temperature at a time of continuously operating the image reading apparatus 10 for a long time. The humidity sensor detects rising of external humidity of the image reading apparatus 10. Further, the CPU 504 detects, when the power source of the image reading apparatus 10 is turned on, that a processed paper number of an image reading document exceeds a predetermined setting value, or an elapsed time from the last correction is counted and a predetermined setting time elapses.

When the condition determination unit 506 receives an interrupt signal from the sensor 508 and the CPU 504 and determines that reading correction is necessary, the condition determination unit 506 requests a current job status of the image reading unit 142 to the CPU 504. The CPU 504 receives the request, and transmits the job status to the condition determination unit 506.

When a job during scanning is already operated or a job for the next scanning is input, the condition determination unit 506 instructs the CPU 504 to switch to a reading operation of the pattern data from the display device 110 after elapsing a predetermined time.

Processing for reading pattern data corresponding to a mounting position 1 of the display device 110 illustrated in FIG. 1 will be described with reference to FIG. 7. The display device 110 is installed so as to face the document positioning plate 101 at a time of reading. In addition, the display device 110 may contact to or separate from the document positioning plate 101.

When the image reading unit 142 reads a normal document (hereinafter referred to as a normal mode), a light source lamp 102 irradiates a document positioned on the document positioning plate 101, and the solid image sensor 108 reads the reflected light.

When the image reading unit 142 reads the pattern data displayed by the display device 110 (hereinafter referred to as a correction mode), the pattern data displayed by the display device 110 is read by the processing similar to the normal mode because the display device 110 is arranged to face the document positioning plate 101.

Processing for reading pattern data corresponding to a mounting position 2 of the display device 110 illustrated in FIG. 1 will be described with reference to FIG. 8. The display device controller 112 displays pattern data on the display device 110, and the image reading unit 142 reads the displayed pattern data. The display device 110 is installed outside the document positioning plate 101 in the image reading unit 142.

Figure 8:
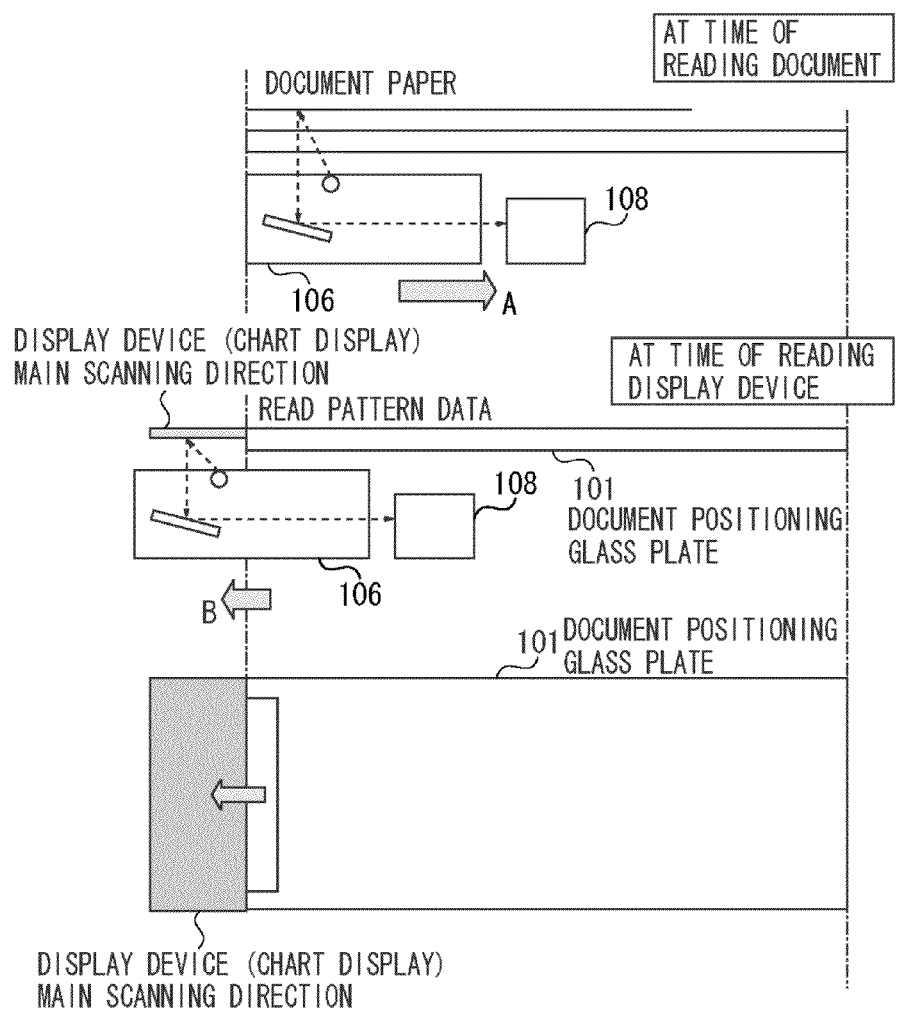
FIG. 8 illustrates a reading configuration of a mounting position 2 of a display device according to an exemplary embodiment.

When the image reading unit 142 reads the normal document (in the normal mode), the solid image sensor unit 106 exposes the document positioned on the document positioning plate 101 to the light, while moving in the direction of an arrow A in FIG. 8. The solid image sensor 108 reads the reflected light via the solid image sensor unit 106.

When the image reading unit 142 reads the pattern data displayed by the display device 110 (in the correction mode), an optical element unit is moved exceeding a normal document reading range because the display device 110 is installed outside the document reading position of the document positioning plate 101. Then, the optical element unit reads the pattern data displayed by the display device 110.

According to an instruction for control from the controller unit 30, the optical element unit is moved to the side of the display device 110 in the direction of an arrow B in FIG. 8, and exposes the optical element unit to an image displayed by the display device 110. Then, the solid image sensor 108 receives the reflected light.

Figure 7:
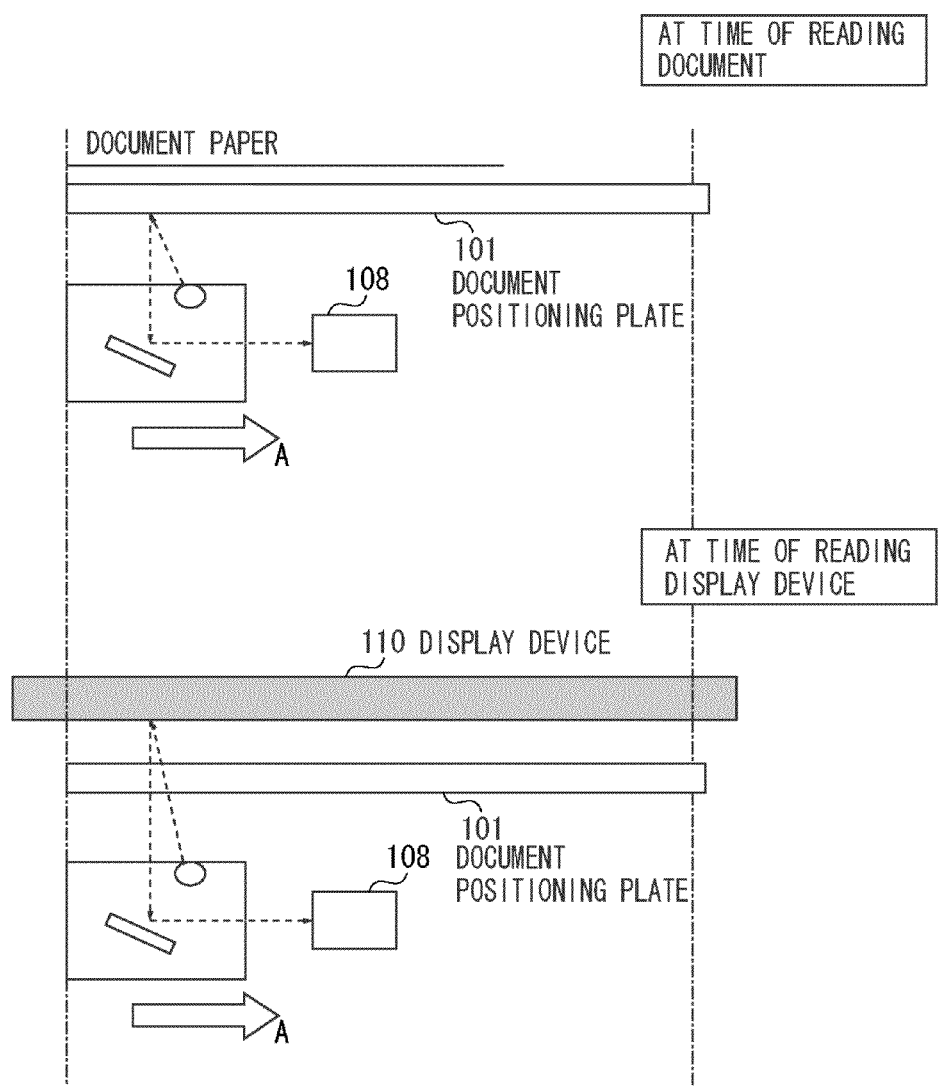
FIG. 7 illustrates a reading configuration of a mounting position 1 of a display device according to an exemplary embodiment.

In the present exemplary embodiment, the display device 110 is installed at a position illustrated in FIG. 7 or 8. However, a mounting position of the display device 110 is not limited thereto as long as the solid image sensor 108 can read the pattern data displayed by the display device 110.

For example, the display device 110 can be arranged between the document positioning plate 101 and the solid image sensor 108. When the image reading correction is performed for the change of the characteristic of the solid image sensor 108 or the imaging lens 107, the display device 110 may be arranged inside the solid image sensor unit 106. Further, the display device 110 may be arranged at a position far from the document positioning plate 101.

In a configuration in which the display device controller 112 controls displaying of the display device 110, the display device 110 may be detachable from the image reading apparatus 10. Further, the present invention is not limited by a kind of the display device.

Figure 9:
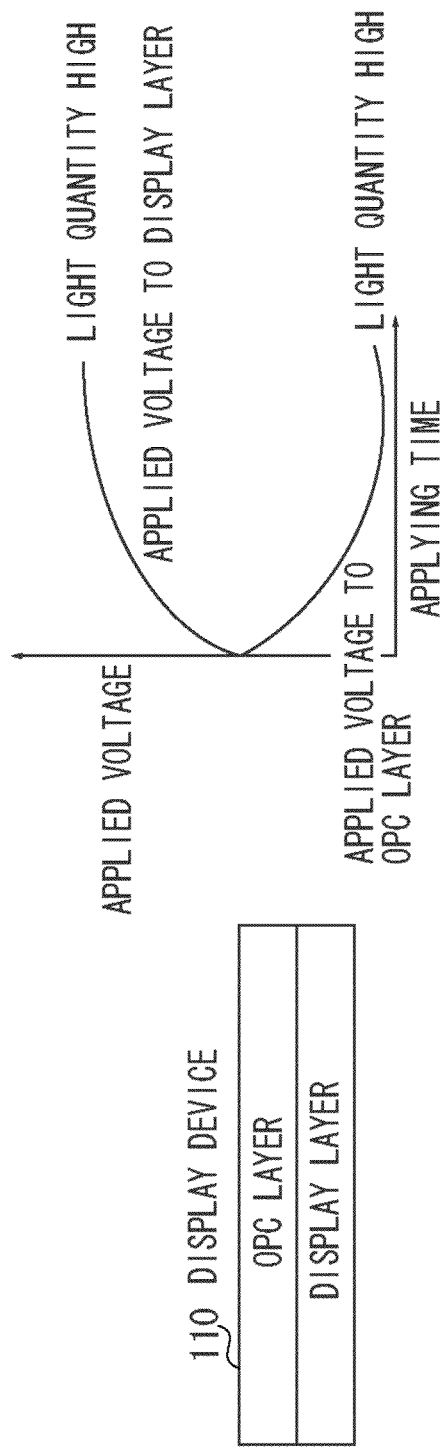
FIG. 9 illustrates a configuration of a display device and a method for applying voltages

FIG. 9 illustrates a configuration of the display device 110 and a method for controlling applied voltage to the display device controller 112 at a time of reading the pattern data displayed by the display device 110.

The display device 110 includes, for example, an electronic paper using cholesteric liquid crystal. The cholesteric liquid crystal has a mechanism that can control a portion for permeating light and a portion for reflecting light by applying a voltage.

The cholesteric liquid crystal can be controlled so that cancelling and maintaining a display state for every pixel are changed with an amplitude of the applied voltage, and can be colored by laminating three layers of the RGB. Thus, the cholesteric liquid crystal can display various pattern data according to kinds of correction processing.

For example, the cholesteric liquid crystal can display line chart pattern data for resolution of 600 dpi, a gradation chart of 256 gradations, and a color patch. The cholesteric liquid crystal can display pattern data corresponding to each of applications, e.g., distortion of an optical system in the reading unit 142, and change of the MTF value due to change of the optical characteristics.

The display device controller 112 controls an optimum value of the applied voltage value to the display device 110 so that the solid image sensor 108 can read the pattern data displayed by the displayed device 110 with optimum contrast and resolution. The display device controller 112 calculates the applied voltage value by previously adding the characteristics of the reading optical system from the characteristic value of the display device 110.

According to the calculated applied voltage value, the display device controller 112 causes the display device 110 to output the pattern data received from the scanner controller 113. More particularly, the pattern data displayed by the display device 110 is formed on a charge coupled device (CCD) sensor via the optical system, and the display device controller 112 evaluates contrast of the read image. Based on the evaluated results, the display device controller 112 controls the applied voltage to the display device 110.

In the present exemplary embodiment, the electronic paper using cholesteric liquid crystal as the display device 110 is described as an example. However, the present invention is not limited thereto. For example, a display device, in which the pattern data cannot be rewritten, may be used. In this case, the display device 110 previously stores the pattern data in a storage unit (not illustrated) built in the display device 110, and displays the pattern data by an instruction received from the controller unit 30.

An optical path length difference, which is due to a difference of configurations of a collecting optical system, could occur between in a case of reading the normal document and in a case of reading the pattern data displayed by the display device 110. That is, a focal position in the solid image sensor 108 could be different. Thus, the image reading unit 142 could not read the pattern data of the display device 110 with appropriate contrast and resolution.

Therefore, as illustrated in FIG. 9, the display device controller 112 controls the applied voltage to the display device 110 so as to interpolate the difference of the optical path length. In other words, the display device controller 112 adjusts a voltage value to interpolate the difference of the optical path length so that the display device 110 can display the pattern data with resolution or contrast, which is readable by the image reading unit 142.

Figure 10:
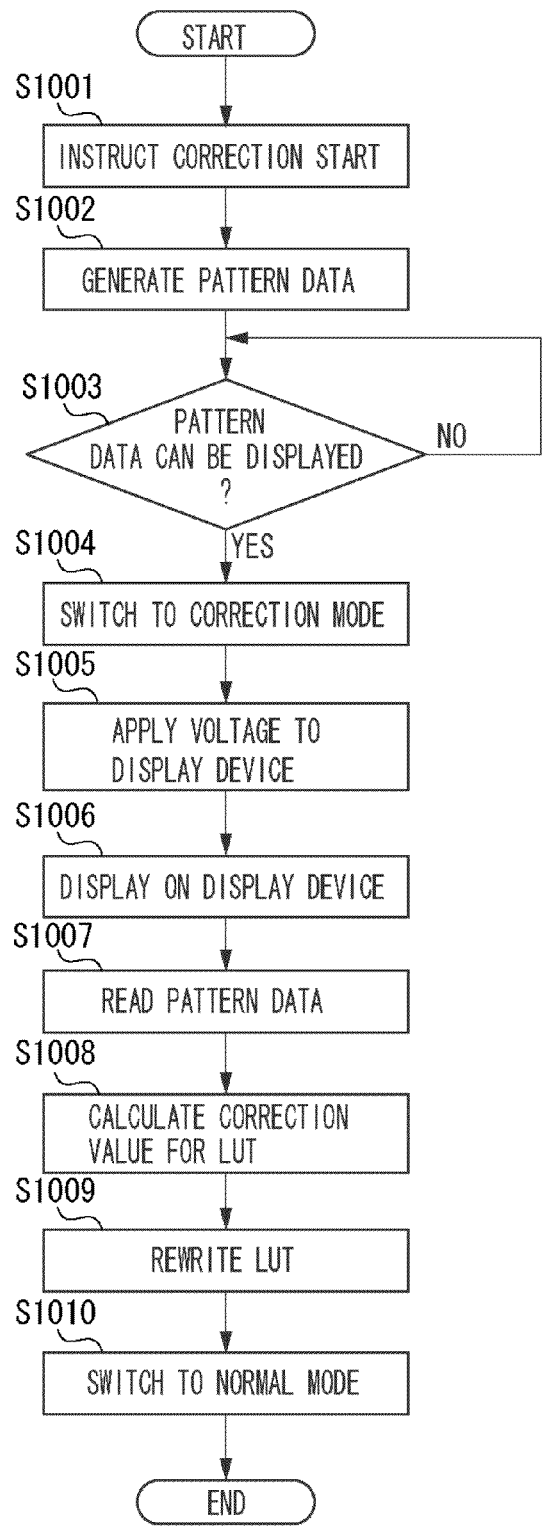
FIG. 10 illustrates a flowchart of image reading correction according to an exemplary embodiment.

Next, a flow of processing for image reading correction of the exemplary embodiment having the aforementioned configuration will be described. The storage unit 116 in the controller unit 30 stores a program for executing each processing in the flowchart in FIG. 10, and the CPU 504 executes the program.

In step S1001, a user presses a correction start instruction button provided at the operation unit 114, and inputs an instruction for starting correction to the controller unit 30.

In step S1002, the CPU 504 receives the instruction input to the controller unit 30, and instructs the pattern generation unit 500 to generate pattern data. The pattern generation unit 500, in response to the instruction, generates the pattern data to be displayed on the display device 110. The pattern generation unit 500 generates the pattern data according to a setting value previously set.

The pattern generation unit 500 generates the pattern data after the CPU 504 issues instruction to start correction. However, the pattern generation unit 500 can generate pattern data that is previously set.

In step S1003, the CPU 504 determines whether the display device 110 is in a state where pattern data can be displayed. For example, when processing for reading document data is still performing, the CPU 504 does not transmit an instruction for starting displaying to the display device 110 until the processing ends.

In this case, the CPU 504 sets the instruction for starting displaying to output after elapsing a predetermined time according to the job status. After the CPU 504 determines whether image correction can be started, the CPU 504 starts instructing the display device 110 to display the pattern data. When the image reading correction is not performed, the CPU 504 does not display the pattern data on the display device 110.

In addition, the display device 110 may constantly display the pattern data before the CPU 504 issues an instruction to start displaying the pattern data. In this case, the display device 110 needs to be arranged at a position where there is no effect on reading of a document. For example, the display device 110 is arranged at a mounting position 2 in FIG. 1, which is far from the document positioning plate 101.

When the CPU determines that the pattern data can be displayed on the display device 110 (YES in step S1003) in step S1003, then in step S1004, the CPU 504 switches a normal mode for reading a document to a correction mode for reading the pattern data and performing the image reading correction. More particularly, the CPU 504 selects the selectors 501 and 507 as a path for performing the image reading correction.

After the pattern generation unit 500 receives switching to the correction mode, the pattern generation unit 500 outputs the pattern data to the display device controller 112. In step S1005, the display device controller 112 applies the voltage to the display device 110. In step S1006, the display device controller 112 causes the display device 110 to display specific pattern data.

When the CPU 504 performs two kinds of corrections of the MTF correction and the gradation correction, the display device controller 112 causes the display device 110 to display the pattern data for the MTF correction (e.g., illustrated in FIG. 5A), and the CPU 504 executes the correction processing from step S1007 to step S1009.

Then, the display device controller 112 causes the display device 110 to display the pattern data for the gradation correction (e.g., illustrated in FIG. 5B), and the CPU 504 executes the correction processing from step S1007 to step S1009. When the CPU 504 performs one correction processing (e.g., the MTF correction), the display device controller 112 causes the display device 110 to display the pattern data for the MTF correction, and the CPU 504 executes the correction processing from step S1007 to step S1009.

Then, the CPU 504 issues an instruction to read the pattern data. In step S1007, the solid image sensor 108 in the solid image sensor unit 106 reads the pattern data displayed by the display device 110 via the scanning mirrors 103, 104, and 105, and outputs the pattern data as image data to the controller unit 30. In step S1008, in order to calculate the correction value, the CPU 504 calculates the MTF value referring to the data of the LUT table correction unit 502 based on the image data read by the solid image sensor 108.

In step S1009, the CPU 504 newly rewrites a parameter value stored in the LUT memory 505 according to the calculated correction value. The CPU 504 compares a pixel value with the value of the look-up table value according to the position of a pixel of image data to be read. When the pixel value is more than the prescribed value, the CPU 504 rewrites the pixel value to the value of the look-up table.

In step S1010, after completing rewriting the parameter value in the LUT memory 505, the CPU 504 switches the mode to the normal mode. At this time, the CPU 504 switches the selectors 501 and 507 to a path for reading the document data, and switches the mode to the normal mode. Further, the CPU 504 decreases the applied voltage from the display device controller 112, switches the display device 110 to be a non-display state, and ends the processing for image reading correction.

In the present exemplary embodiment, filtering processing referring to the look-up table is performed. However, other image reading correction can be performed.

According to the present exemplary embodiment, since the image reading apparatus 10 reads the pattern data displayed by the display device 110, an operation for reading a printed paper by a user's operation is not necessary, and time and effort of the user can be reduced.

Further, the operation unit 114 includes the correction start instruction button. The image reading apparatus 10 detects that a user presses the correction start instruction button, and starts reading the pattern data displayed by the display device 110. Therefore, when a user wants to correct an image, the user can easily perform the processing for image reading correction.

Figure 11:
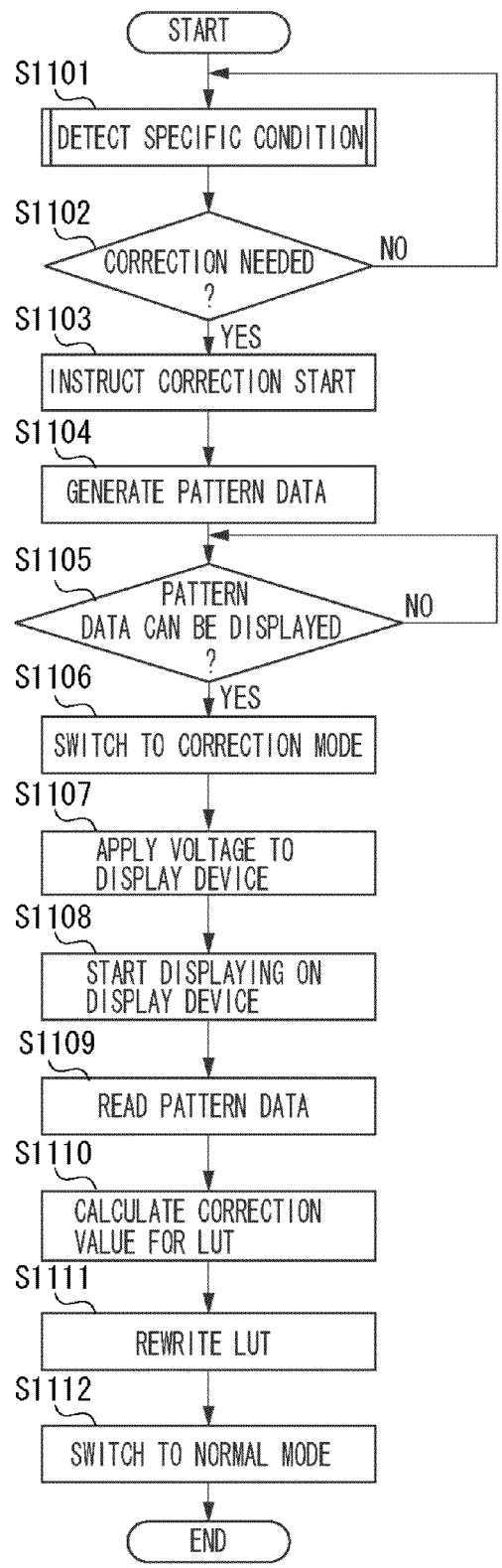
FIG. 11 is a flowchart illustrating correction processing performed at a time of detecting a specific condition according to an exemplary embodiment.

FIG. 11 illustrates a detailed flowchart of processing for image reading correction, which is performed when the CPU 504 detects specific conditions in step S1101. The processing for image reading correction illustrated in the flowchart in FIG. 10 starts when a user presses the correction start instruction button.

On the other hand, in the processing illustrated in the flowchart in FIG. 11, the CPU 504 detects conditions at a time of reading an image, determines whether correction is performed when the CPU 504 detects specific conditions, and starts correction. Since processing from step S1103 to step S1112 illustrated in the flowchart in FIG. 11 is similar to the processing from step S1001 to step S1010 in FIG. 10, the description will be omitted.

In the image reading correction illustrated in the flowchart in FIG. 11, the sensor 508 or the CPU 504 monitors conditions at a time of reading a document. The detailed conditions will be described below with reference to FIG. 12. In step S1101, the sensor 508 or the CPU 504 outputs a detection signal to the condition determination unit 506, in response to the detection of specific conditions.

In step S1102, the condition determination unit 506 receives the detection signal, and determines whether the correction is performed. In the present exemplary embodiment, the CPU 504 sets the condition in which the condition determination unit 506 counts number of times of receiving the detection signal, and starts correction when the predetermined number of times of the signal is detected. The condition determination unit 506 has a variable for storing the number of times of outputting the detection signal indicating that a specific condition is detected, and adds the number of interruptions by a counter.

When the added value exceeds the prescribed value, the condition determination unit 506 outputs a correction request signal to the CPU 504. The processing of image reading correction starts when the correction request signal is output to the CPU 504. In addition, the CPU 504 can set the condition that the image reading correction starts when the condition determination unit 502 receives the detection signal even only once.

Figure 12A:
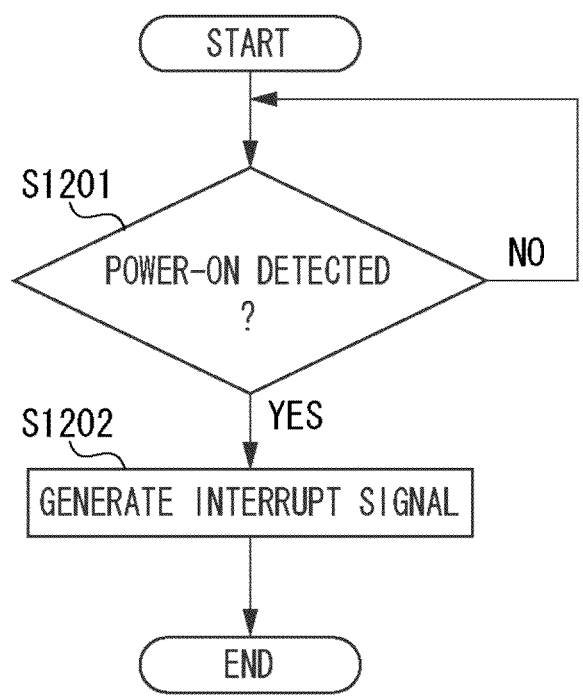
FIGS. 12A, 12B, 12C, and 12D are flowcharts illustrating specific condition detection processing according to an exemplary embodiment.
Figure 12B:
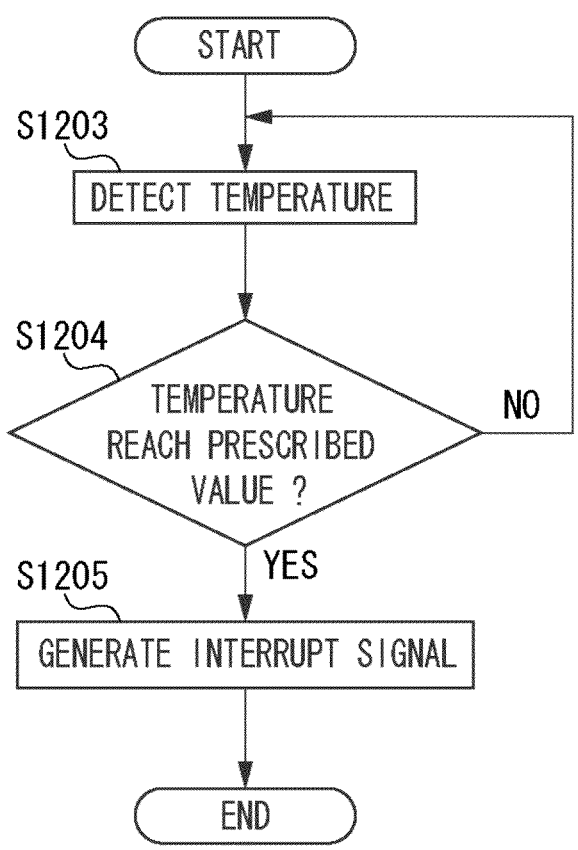
Figure 12C:
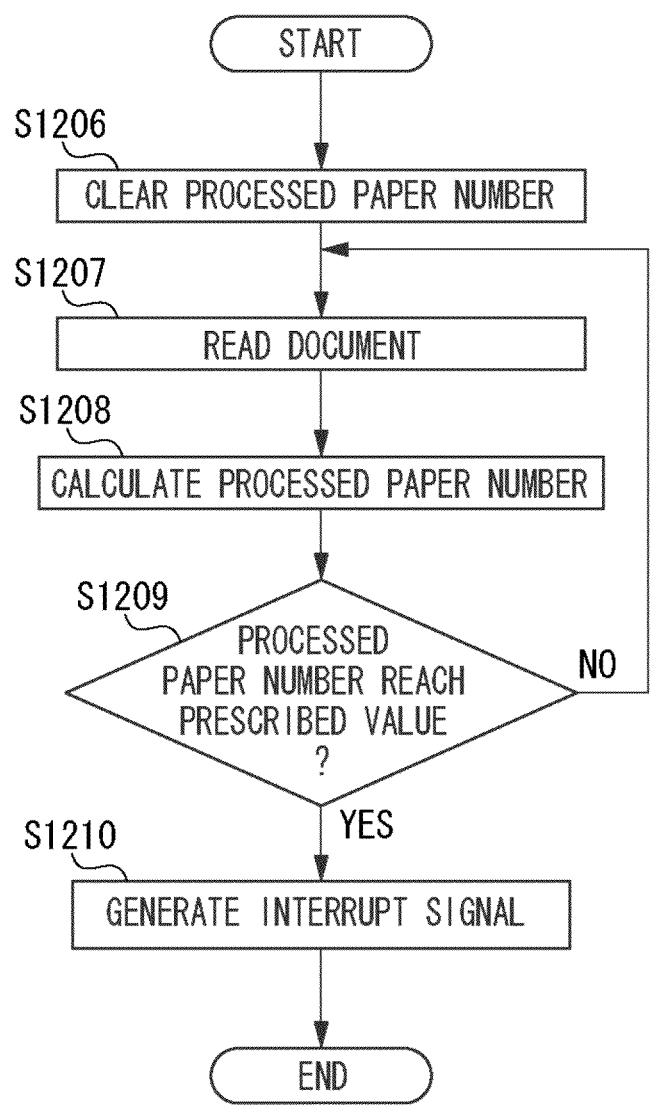
Figure 12D:
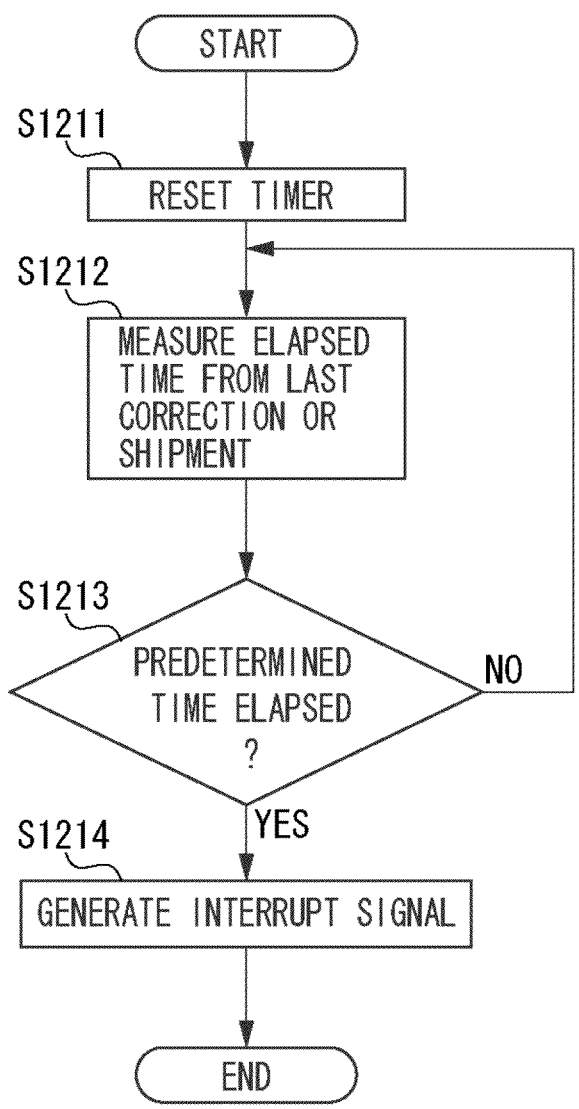

A flowchart in FIGS. 12A to 12C illustrates processing for detecting a specific condition in step S1101 in FIG. 11. Detailed processing for detecting the specific condition in step S1101 in FIG. 11 is any one of FIGS. 12A to 12D. FIG. 12A illustrates the processing at a time of turning on a power source. FIG. 12B illustrates the processing when temperature of the image reading apparatus 10 exceeds a prescribed temperature. FIG. 12C illustrates the processing when the document reading processing is performed in a predetermined processed paper number or more. FIG. 12D illustrates the processing when a predetermined time elapses after the last correction. When the CPU 504 detects any one of the conditions from FIGS. 12A to 12D, the CPU 504 determines that a specific condition is detected.

In step S1201 in FIG. 12A, the CPU 504 detects that power source is turned on by pressing a power source switch (not illustrated) provided in the operation unit 114 or inputting an instruction from outside. In step S1202, the CPU 504 detecting the power-on (YES in step 1201) generates an interruption signal, and transmits the interruption signal (the correction request signal) to the condition determination unit 506.

FIG. 12B illustrates the flowchart when the temperature in the apparatus exceeds a prescribed temperature. In step S1203, the MFP 100 or a temperature sensor provided in the image reading apparatus 10 detects temperature. The temperature sensor is arranged around the optical element unit. In step S1204, the temperature sensor determines whether the temperature in the image reading apparatus 10 reaches a prescribed value. When the temperature in the image reading apparatus 10 exceeds a temperature threshold value which is set in advance (YES in step S1204), then in step S1205, the temperature sensor generates the interruption signal, and transmits the interruption signal to the condition determination unit 506.

In the flowchart in FIG. 12B, the temperature sensor detects that the temperature reaches the prescribed temperature. However, a humidity sensor detecting humidity in the image reading apparatus 10 can be used instead of the temperature sensor. Further, a position sensor can be used for detecting a position of an optical element such as the scanning mirrors 103, 104, and 105, or the solid image sensor 106.

FIG. 12C illustrates the flowchart when the reading processing of a document is performed in the predetermined paper number or more. The scanner controller 113 has a memory (not illustrated) for storing the reading processed paper number of a document. In step S1206, the scanner controller 113 performs processing for initializing the reading processed paper number of a document. In steps S1207 and S1208, the scanner controller 113 adds a counter value stored in the memory whenever reading one paper of a document.

In step S1209, the CPU 504 determines whether the processed paper number reaches the prescribed value. When the processed paper number reaches the previously set number (YES in step S1209), then in step S1210, the CPU 504 generates the interruption signal as the correction request signal, and transmits the interruption signal to the condition determination unit 506.

FIG. 12D illustrates the flowchart when a predetermined time elapses after the last correction. The scanner controller 113 includes a timer for measuring a time.

In step S1211, the scanner controller 113 resets the timer for measuring a time. In step S1212, the scanner controller 113 measures an elapsed time. When a first image reading correction is performed, the scanner controller 113 measures the elapsed time after writing a look-up table value to the LUT memory 505 at a time of shipping a product because the last image reading correction is not performed.

In step S1213, the CPU 504 determines whether a predetermined time elapses. When the predetermined time elapses (YES in step S1213), the CPU 504 transmits the interruption signal as the correction request signal to the condition determination unit 506. The condition determination unit 506 issues an instruction to start correction, and the correction starts.

As illustrated in the flowcharts from FIGS. 12A to 12D, the CPU 504 determines that the image reading apparatus 10 needs to perform correction according to the conditions that power source is turned on, the predetermined paper number of documents is read, or the temperature in the image reading apparatus 10 exceeds the prescribed value. Then, the condition determination unit 502 issues an instruction to start image reading correction according to the necessity for correction. Therefore, the image reading apparatus 10 can perform correction while a user is not aware of the staring of image reading correction.

For a user who requests image quality of image data with high accuracy, the image reading apparatus 10 can be set to perform correction according to a plurality of specific conditions. For example, the image reading apparatus is set to perform correction at a time of reading a predetermined paper number of documents and elapsing a predetermined time after the last image reading correction.

As for timing for performing image reading correction, the present invention is not limited to the example in which correction is performed according to the specific conditions described in the present exemplary embodiment. For example, the image reading apparatus 10 can be set to perform batch processing in which correction is performed at a specific time. Since the image reading apparatus can perform correction without having user's awareness, automatization of image reading correction can be attained.

According to the present exemplary embodiment, the pattern generation unit 500 can generate arbitrary pattern data, and can cause the display device 110 to display the pattern data. Thus, display pattern data having high flexibility can be displayed according to a kind of image reading correction. For example, when the pattern generation unit 500 causes the pattern data of a color patch to be displayed, the pattern generation unit 500 can change the number of gradation according to the request of reading accuracy.

According to the present exemplary embodiment, a common one reading unit is used as the reading unit configured to read a document and a reading unit configured to read the pattern data displayed by the display device 110.

Therefore, a new reading unit configured to perform image reading correction is not necessary. Thus, image reading correction can be performed using the display device 110 without greatly increasing the number of parts. In this case, the display device controller 112 needs to control applied voltage to the display device 110, considering the difference of an optical path length between the display device 110 and the document.

In the first exemplary embodiment, the processing for reading one-sided data at a time of reading a document is described. In the second exemplary embodiment, processing for reading two-sided data of a document will be described. A display devices is provided corresponding to each of a sensor configured to read image data of a surface of a document and a sensor configured to read image data of a rear surface of a document. A basic configuration of the second exemplary embodiment is similar to the configuration of the first exemplary embodiment, and different portions will be mainly described below.

Figure 13:
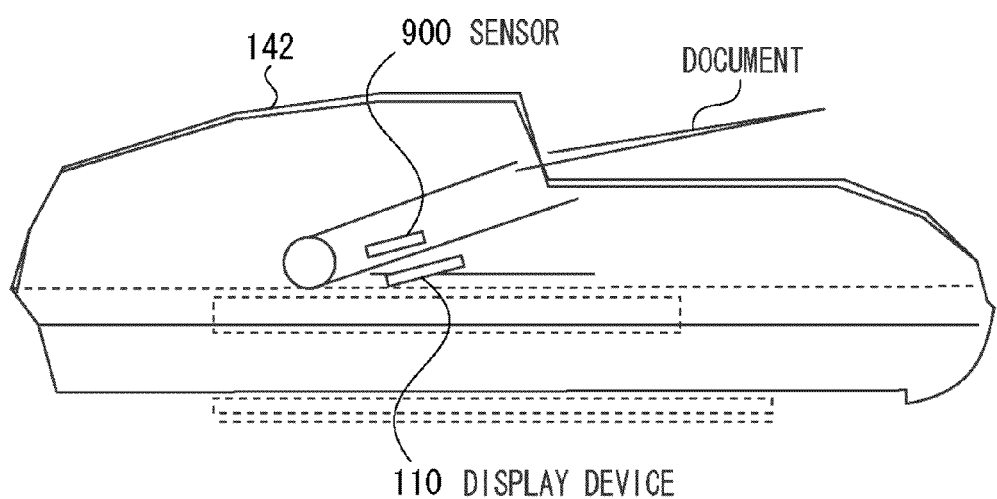
FIG. 13 illustrates a configuration of a display device and a reading sensor according to a second exemplary embodiment.

FIG. 13 illustrates a position at which the display device 110 is arranged when the image reading unit 142 reads two-sided data of a document. The document is fed to an auto document feeder (ADF), and conveyed to a reading position of a sensor 900. Then, the sensor 900 reads the image data on a rear surface of the document.

The image reading unit 142 includes a rear surface image reading unit, and is configured to read two sides of a document. In this case, the image reading unit 142 separately includes another sensor 900 for reading an image on the rear surface at a rear surface reading portion. For example, a contact image sensor (CIS) is used as the sensor 900. As illustrated in FIG. 13, the display device 110 is arranged at a position where the sensor 900 can read the display device 110.

Figure 14:
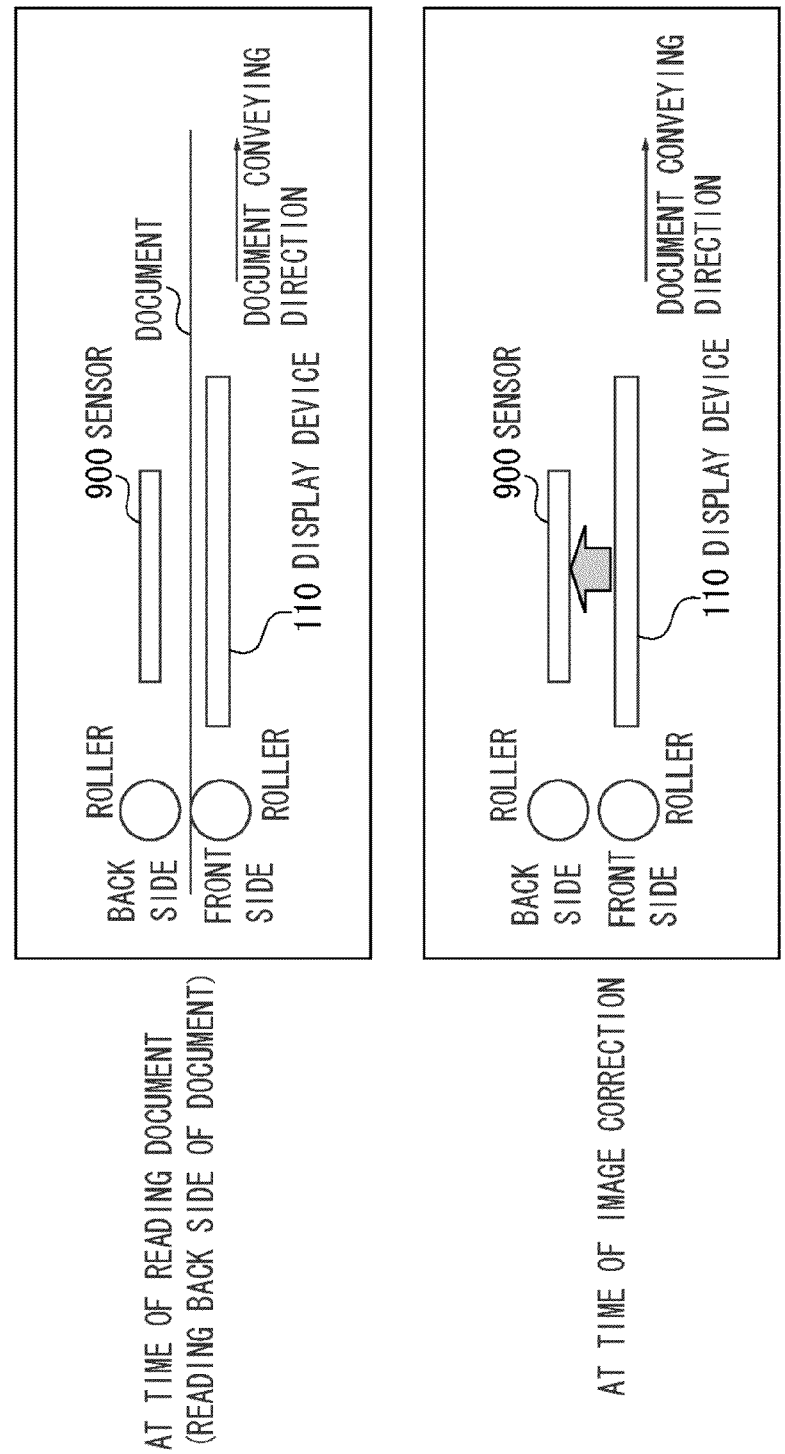
FIG. 14 illustrates a reading configuration according to the second exemplary embodiment.

FIG. 14 illustrates an operation for reading a rear surface of a document and an operation for reading pattern data from the display device 110. When the image reading unit 142 reads the rear surface of the document (in the normal mode), the image reading unit 142 conveys the document through a roller, and reads at a position where the sensor 900 is arranged. On the other hand, when the image reading unit 142 reads the pattern data displayed by the display device 110 (in the correction mode), the display device 110 displays specific pattern data, like the first exemplary embodiment. The sensor 900 reads the specific pattern data displayed by the display device 110.

When the sensor 900 reads the pattern data from the display device 110, a specific space is formed for not grounding the sensor 900 and the display device 110. An interval of the space is regarded as a difference of optical path lengths, and an applied voltage to the display device 110 is controlled to reduce the effects of an imaging position difference between at a time of reading the pattern data and at a time of reading the document. The display device controller 112 controls the applied voltage to the display device 110, like the first exemplary embodiment. Surface data of the document is read by similar processing to the processing in the first exemplary embodiment.

An operation of the second exemplary embodiment having the aforementioned configuration will be described with reference to a flowchart in FIG. 15.

Figure 15:
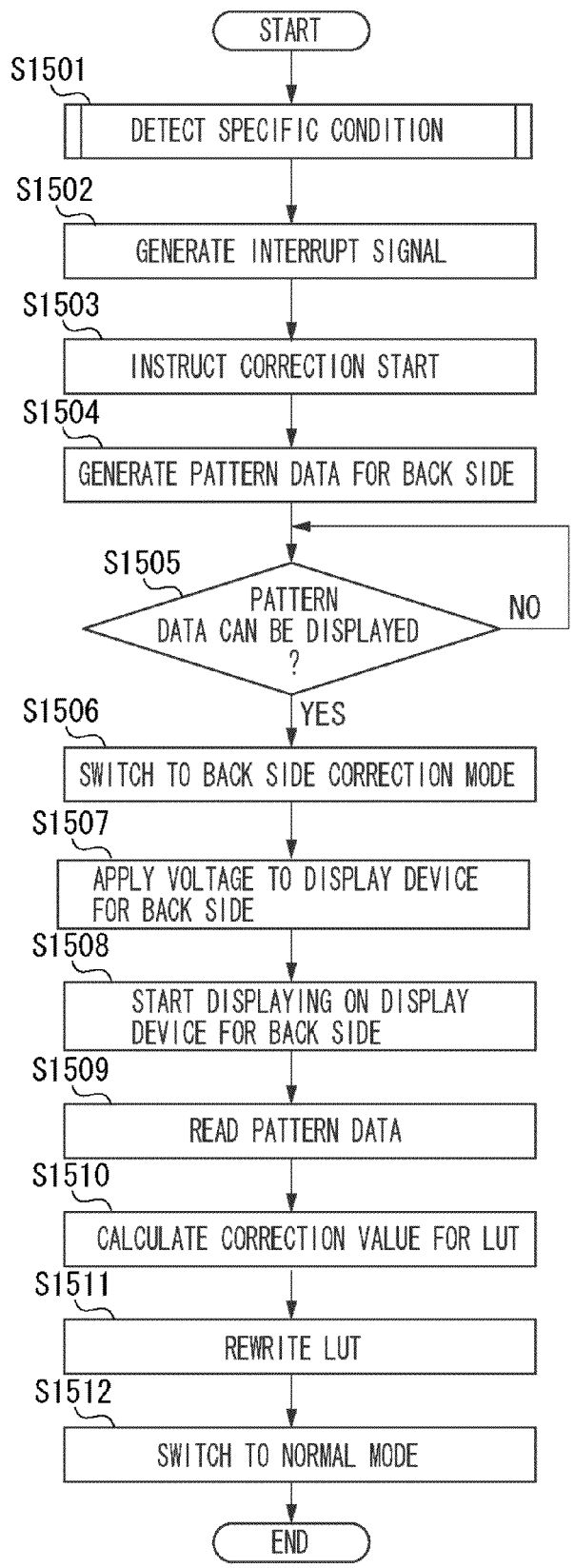
FIG. 15 is a flowchart illustrating image reading correction processing according to the second exemplary embodiment.

Referring to FIG. 15, a flow of image reading correction processing of an image reading apparatus having a function for reading two-side of a document will be described. In the flowchart illustrated in FIG. 15, processing for correcting the rear surface image reading unit is added to the processing of the image reading correction illustrated in FIG. 11 according to the first exemplary embodiment. Further, the storage unit 116 stores a program for executing the flowchart in FIG. 15.

In step S1501, the CPU 504 detects a specific condition. As illustrated in the flowchart in FIG. 12 described according to the first exemplary embodiment, the specific condition is a condition when a status is generated, in which the image reading correction is needed. For example, the specific condition is generated when detecting turning-on of power source or reading the predetermined paper number of documents. In addition, the specific condition can be set to perform image reading correction of image data on a rear surface together with performing image reading correction of image data on a surface.

In step S1502, the CPU 504 or the sensor 508, which detect the specific condition in step S1501, outputs an interruption signal to the condition determination unit 502. In step S1503, the condition determination unit 502 having received the interruption signal instructs the CPU 504 to start the reading correction of an image on a rear surface. The CPU 504 instructs the pattern generation unit 500 to generate pattern data, which is to be displayed on the display device 110 for a rear surface.

In step S1504, the pattern generation unit 500 having received the instruction generates pattern data to be displayed on the display device 110 for a rear surface. The pattern data may be different from the pattern data generated in step S902 in FIG. 9. In other words, the image reading correction of the reading unit for a surface and the image reading correction for a rear surface have a configuration in which the pattern data is read by the different sensors. Thus, the pattern data to be read can be different.

In step S1505, the CPU 504 determines whether the pattern data can be displayed on the display device 110, according to the instruction for starting correction. When the CPU 504 determines that the pattern data can be displayed on the display device 110 (YES in step S1505), the CPU 504 selects the selectors 501 and 507 as a path for performing the image reading correction, and, in step S1506, switches the modes from the normal mode to the correction mode.

After the CPU 504 selects the selectors 501 and 507 and switches to the correction mode, the pattern generation unit 500 outputs the pattern data to the display device controller 112. In step S1507, the display device controller 112 receives the pattern data from the pattern generation unit 500, applies the applied voltage to the display device 110, and causes the display device 110 to display the pattern data. In step S1508, the display device 110 displays the pattern data.

In step S1509, the sensor 900 reads the pattern data from the display device 110, and outputs the pattern data as image data to the controller unit 30. In step S1510, the LUT table correction unit 502 calculates a correction value of an output value of the look-up table stored in the LUT memory 505, based on the image data read by the sensor 900. Desirably, the output value stored in the LUT memory 505 includes parameters for a surface and a rear surface separately.

In step S1511, the CPU 504 newly rewrites a parameter value stored in the LUT memory 505, according to the calculated correction value. The CPU 504 compares a pixel value with the look-up table value according to a position of a pixel of read image data. When the pixel value exceeds the prescribed value, the CPU 504 rewrites the look-up table value.

Therefore, correction of the parameter of the LUT memory 505 is performed by correcting, from an optical characteristic curve, intensity of light received by the sensor 900, according to an optical characteristic of the optical device. In step S1511, the CPU 504 calculates a look-up table value of 8×8 to the read image data that is appropriate for the light-receiving intensity, based on the result of the correction of the optical characteristic curve.

In step S1512, when the CPU 504 completes rewriting the parameter value in the LUT memory 505, the CPU 504 switches the mode to the normal mode. When the CPU 504 switches the mode to the normal mode, the CPU 504 switches the selectors 501 and 507 to an image path for reading document data, and switches the mode to the normal mode. In addition, the CPU 504 decreases the applied voltage supplied from the display device controller 112, switches the display device 110 to the non-display state, and ends the processing for the image reading correction.

According to the present exemplary embodiment, image reading correction to image data on a surface of a document and image reading correction to image data on a rear surface of a document are performed independently. Therefore, the image reading correction can be performed, considering a characteristic difference between the sensor for reading the surface of the document and the sensor for reading the rear surface of the document.

The image reading apparatus according to the present invention can be applied to a scanner configured to read document. In addition to this, the image reading apparatus can be applied to a film scanner configured to read a film, and a barcode reader configured to read a barcode if the scanners have a configuration in which target data can be read.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-142536 filed Jun. 15, 2009, which is hereby incorporated by reference herein in its entirety.

What is claimed is:

1. An image reading apparatus comprising:
    a document reading unit configured to read a document;
    a generation unit configured to generate gradation pattern data expressed with gradation for correcting a reading characteristic of the document reading unit;
    a display unit configured to display the gradation pattern data generated by the generation unit, wherein the display unit is electronic paper of which display contents are rewritable;
    a pattern reading unit configured to read the gradation pattern data displayed by the display unit;
    a display control unit configured to control displaying to the display unit, wherein the display control unit controls a voltage applied to the display unit to interpolate a difference of optical path lengths between a length when reading a document by the document reading unit and a length when reading the displayed gradation pattern data by the pattern reading unit; and
    a correction unit configured to correct the reading characteristic of the document reading unit, based on the gradation pattern data generated by the generation unit and the gradation pattern data read by the pattern reading unit.

2. The image reading apparatus according to claim 1, wherein the gradation pattern data generated by the generation unit is determined according to correction contents in the correction unit.

3. The image reading apparatus according to claim 1, further comprising:
    an input unit configured to input an instruction to the display unit to display the gradation pattern data,
    wherein the display unit displays the gradation pattern data according to the instruction input by the input unit, and
    wherein the pattern reading unit reads the displayed gradation pattern data.

4. The image reading apparatus according to claim 1, further comprising:
    a detection unit configured to detect a condition for correcting the reading characteristic of the document reading unit,
    wherein the display unit displays the gradation pattern data when the detection unit detects the condition for correcting the reading characteristic, and
    wherein the pattern reading unit reads the displayed gradation pattern data.

5. The image reading apparatus according to claim 4, wherein the condition for correcting the reading characteristic is that a power source of the image reading apparatus is turned on.

6. The image reading apparatus according to claim 4, wherein the condition for correcting the reading characteristic is that temperature inside the image reading apparatus is higher than a predetermined temperature.

7. The image reading apparatus according to claim 4, wherein the condition for correcting the reading characteristic is that the document reading unit reads a predetermined number of documents.

8. The image reading apparatus according to claim 4, wherein the condition for correcting the reading characteristic is that an elapsed time after correcting the reading characteristic by the correction unit exceeds a predetermined time.

9. An image reading method comprising:
generating gradation pattern data expressed with gradation for correcting a reading characteristic of a document reading apparatus configured to read a document;
displaying the generated gradation pattern data on electronic paper of which display contents are rewritable;
reading the displayed gradation pattern data;
controlling a voltage applied to the electronic paper to interpolate a difference of optical path lengths between a length when reading a document by the document reading apparatus and a length when reading the displayed gradation pattern data; and
correcting the reading characteristic of the document reading apparatus, based on the generated gradation pattern data and the read gradation pattern data.

* * * * *